United States Patent [19]

Richtmeyer et al.

[11] Patent Number: 4,886,479
[45] Date of Patent: Dec. 12, 1989

[54] UNIVERSAL JOINT INCLUDING ROLLER BEARINGS

[75] Inventors: Robert D. Richtmeyer, Goshen; Kelvin M. Smith, Winsted, both of Conn.

[73] Assignee: The Torrington Company, Torrington, Conn.

[21] Appl. No.: 242,583

[22] Filed: Sep. 12, 1988

[51] Int. Cl.$^4$ .............................................. F16D 3/20
[52] U.S. Cl. ................................... 464/111; 464/124; 464/132; 464/905
[58] Field of Search ............... 464/111, 123, 124, 132, 464/905

[56] References Cited

U.S. PATENT DOCUMENTS

| | | |
|---|---|---|
| 3,818,721 | 6/1974 | Wahlmark ........................ 464/111 |
| 3,877,251 | 4/1975 | Wahlmark ........................ 464/111 |
| 4,192,154 | 3/1980 | Nakamura et al. ................ 464/111 |
| 4,379,706 | 4/1983 | Otsuka et al. ................ 464/124 X |
| 4,747,803 | 5/1988 | Kimata et al. .................... 464/111 |
| 4,786,270 | 11/1988 | Iwasaki .......................... 464/111 |
| 4,810,232 | 3/1989 | Farrell et al. .................... 464/111 |

FOREIGN PATENT DOCUMENTS

| | | | |
|---|---|---|---|
| 62-52221 | 3/1987 | Japan ................................. 464/111 |
| 778887 | 7/1957 | United Kingdom ................ 464/123 |

Primary Examiner—Daniel P. Stodola
Attorney, Agent, or Firm—Frank S. Troidl

[57] ABSTRACT

The bearing is used in a constant velocity universal joint of the type used in front wheel drive axles for motor vehicles. The universal joint housing has arcuately spaced apart pairs of parallel flat raceways. A bearing is provided in the arcuate space between each pair of housing raceways. The bearing has a single roller which contacts one raceway at a time with a very small clearance from the other raceway. The single roller has a curved outer periphery. A cylindrical sleeve separates the single roller from a plurality of rollers which roll about a bearing support on a shaft which extends into the universal joint housing. The inner cylindrical surface of the sleeve is in contact with the plurality of rollers, each of which have a curved outer surface.

5 Claims, 2 Drawing Sheets

UNIVERSAL JOINT INCLUDING ROLLER BEARINGS

This invention relates to rolling contact bearings for machine parts or units where the bearing is constructed for straight-line motion and some angular motion. More particularly, this invention is a roller bearing which is useful, among other things, in a front wheel universal joint drive for motor vehicles.

In many front wheel drive passenger cars, the engine trnasfers power through a trnasmission to a drive shaft. The torque is transmitted to driven shafts through constant velocity torque transmitting universal joints. The universal joint includes a housing connected to the drive shaft, with the housing having three circumferentially equally separated pairs of parallel raceways. The driven shaft includes three circumferentially equally spaced anti-friction bearings, with a roller in contact with the universal joint housing raceways. The bearings are constructed to permit linear motion of the driven shaft with respect to the housing and also angularity of the shaft with respect to the housing. In other applications, the shaft with the bearings will be the drive shaft and the shaft with the housing the driven shaft. Housings in a universal joint used in front wheel drive vehicles are made in various shapes. Many of these housings are made with circumferentially spaced raceways which are curved in the radial direction with respect to the housing axis. Examples of such universal joint housings are shown in U.S. Pat. No. 4,484,900 dated Nov. 27, 1984 to Michel A. Orain and entitled "Articulated Transmission Joint Including Rollers" and the German Offenlegenschrift DE 3716-962-A filed May 20, 1987. Other currently made universal joint housings for use in front wheel drive vehicles include circumferentially separated raceways which follow a curved path along which the single roller on a bearing moves. An example is the universal joint housing shown in U.S. Pat. No 4,338,796 dated July 13, 1982 to Michel A. Orain and entitled "Slidable Homokinetic Tripod Joint and A Corresponding Transmission Having a Floating Shaft".

The U.S. Pat. No. 4,729,670 dated Mar. 8, 1988 and issued to Murphy et al, entitled "Roller Bearing" discloses a universal joint housing for use in front wheel drive vehicles which includes circumferentially spaced parallel flat raceways. As shown in the U.S. Pat. No. 4,729,670, the bearings on the driven shaft are rectangularly shaped because it was felt that this shape was necessary in order to provide the proper contact and proper stresses along the contact line of the bearing with the raceways of the housing. However, the rectangularly shaped bearings and the parts therefor are very costly.

Thus, a universal joint for use in front wheel drive vehicles which includes a housing of the type shown in U.S. Pat. No. 4,729,670 but does not necessarily require the rectangular shaped bearing shown in that patent if it is desired to make a less expensive universal joint is highly desirable. This invention provides the art with a type and shape of bearing which is different from that shown in U.S. Pat. No. 4,729,670 and yet might be used with the universal joint housing of the type shown in said patent.

Briefly described, the invention comprises a bearing which is used with a universal joint having a housing provided with a plurality of circumferentially spaced pairs of parallel flat raceways. The bearings are mounted on bearing supports extending radially from a rotatable shaft to between a pair of circumferentially spaced pairs of raceways. Each bearing has a plurality of rollers located around the bearing support and a larger single roller with a curved surface in contact with one raceway at a time with a small clearance from the other raceway. A cylindrical sleeve is mounted about the plurality of rollers. The inner surface of the sleeve provides the outer raceway for the rollers. The larger single roller has a cylindrical inner surface which is slidably mounted on the sleeve. The plurality of rollers, and the sleeve are rotatable about the bearing support but located axially on the bearing support. The larger single roller is rotatable about the bearing support and axially slidable on the sleeve.

The invention as well as its many advantages may be further understood by reference to the following detailed description and drawings in which.

In the various figures, like parts are referred to by like numbers.

Figure 1:
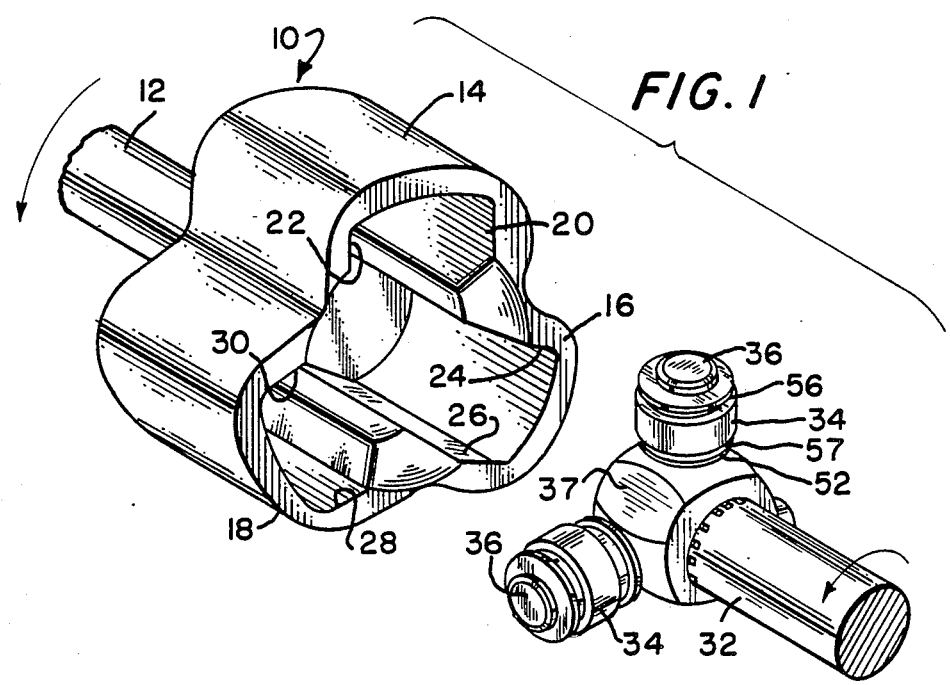
FIG. 1 is an exploded view of a constant velocity universal joint and illustrates one manner in which the new bearing ma be used.
Figure 2:
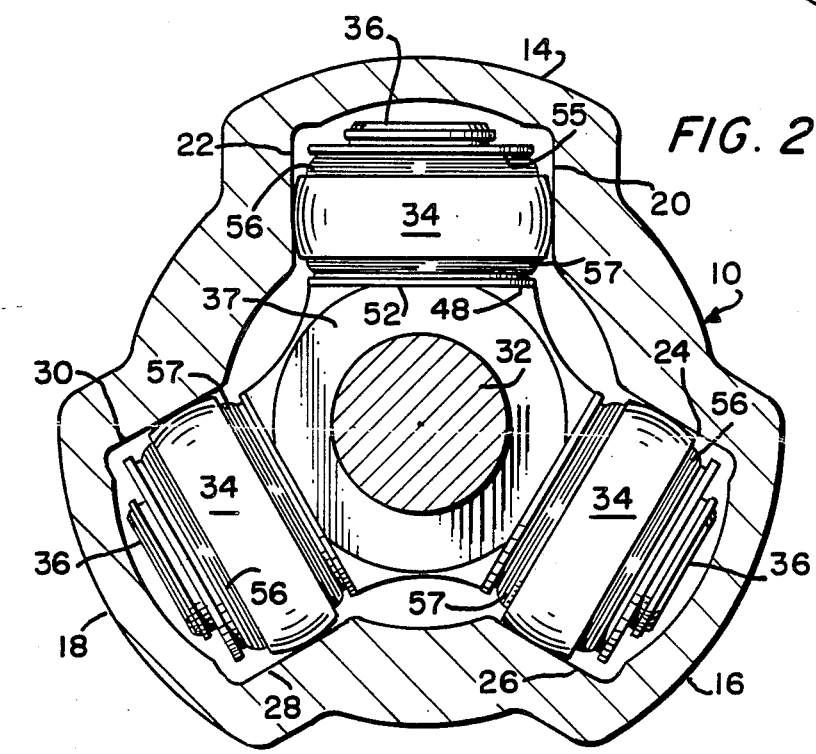
FIG. 2 is a partly sectional view, showing the bearings of FIG. 1 located within the housing.

Referring to the drawings and, more particularly, to FIG. 1 and FIG. 2, the constant velocity universal joint includes a housing 10 rotated by drive shaft 12. The drive shaft 12 might be, for example, rotated by the transmission of a front wheel drive vehicle. The housing 10 includes three circumferentially equally spaced lobes 14, 16, and 18 serving as races. Races 14, 16, and 18 have circumferentially separated parallel flat raceways 20 and 22, 24 and 26, and 28 and 30, respectively.

The drive shaft 12 rotates housing 10 which rotates the spider 37 on driven shaft 32. Three circumferentially equally spaced bearings 34 are each mounted on one of three circumferentially spaced bearing supports 36 extending radially from the spider member 37 connected to the driven shaft 32. The driven shaft 32 may be connected, for example, to a constant speed universal joint for driving a front wheel of a passenger car.

As can be seen by referring to the arrows in FIG. 1, the drive shaft 12 rotates the driven shaft 32 in the same direction as the curved arrows, while at the same time permits the driven shaft 32 to move linearly in either direction along the spaced apart raceways in the outer races 14, 16, and 18. Also, the arrangement permits angular movement of the driven shaft 32 in the housing 10.

Figure 3:
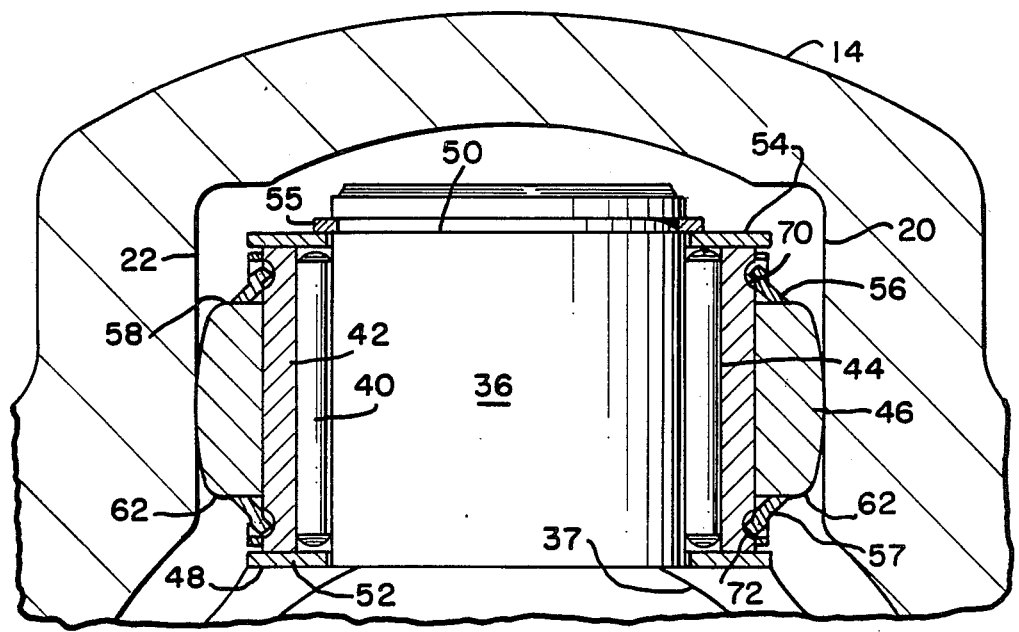
FIG. 3 is an enlarged fragmentary view, partly in section, of the bearings of FIG. 1 and FIG. 2.

Referring to FIG. 3, each bearing support 36 extends radially from the driven shaft 32 to between a pair of spaced raceways. Each bearing includes a plurality of rollers, such as needle rollers 40 in a ring around the bearing support 36. A cylindrical sleeve 42 is mounted about the plurality of rollers 40. The inner surface 44 of the sleeve 42 provides the outer raceway for the needle rollers 40.

A large single roller 46 is mounted on the sleeve 42. The roller 46 has a cylindrical bore and is axially slidable on the sleeve 42. The roller 46 runs between a spaced pair of housing parallel flat raceways such as raceways 20 and 22. The spider 37 is provided with outwardly facing shoulders 48 and each bearing support 36 has an annular groove 50 axially spaced from a shoulder 48. A washer 52 is mounted on the upwardly facing shoulder 48 of spider 37 and around bearing support 36. A second washer 54 is mounted around bearing support 36 and is axially spaced from the washer 52.

A clip ring 55 in groove 50 in bearing support 36 keeps the washers 52 and 54, needle rollers 40, and sleeve 42 in a fixed axial position on the bearing support 36. Though the needle rollers 40 and sleeve 42 are fixed axially on the bearing support, they do rotate about the bearing support.

Annular centering springs 56 and 57 located axially by separated grooves on sleeve 42 exert a spring bias against the end surfaces 58 and 62, respectively of the single roller 46. The springs serve to locate the single roller 46 axially centrally on the sleeve 42 when no torque is transmitted by the universal joint. Annular projections 70 and 72, on springs 56 and 57, respectively, extend into a groove on sleeve 42.

The sleeve 42 and roller 46 rotate about the bearing support 36 at approximately the same r.p.m. However, since the roller 46 is axially slidable along the sleeve 42, the roller 46 is permitted to slide axially with respect to the sleeve 42 in response to the kinematic requirements of the joint. Since the sliding motion of the single roller 46 is relative to the sleeve 42 and not directly along the needle rollers 40, there is no need to have needle rollers which are longer than the sleeve 42.

In currently used constant velocity universal joints, the contact stress on the needle rollers is very high and the contact stress on the single roller housing raceway is relatively low. For example, the contact stress on the needle rollers might be two, three, or four times as high as the contact stress on the single roller housing raceway. Therefore, prior art universal joints are not the best designed from a stress-life standpoint.

Figure 4:
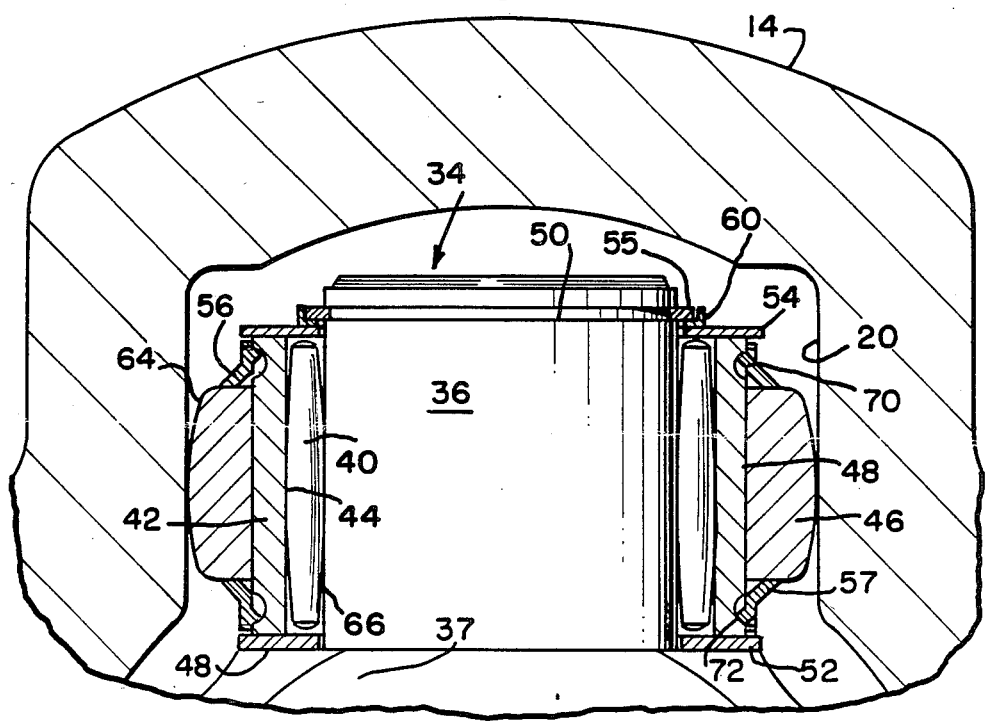
FIG. 4 is a sectional view of a second bearing embodiment.

FIG. 4 shows a bearing embodiment which is specifically constructed to equalize the needle roller contact stress and the single roller housing raceway contact stress. This provides the optimum stress-life when required. The outer periphery 64 of the single roller 46 is curved. The periphery 66 of each of the needle rollers 40 also has a curved surface in the longitudinal direction as well as the circumferential direction of the needle rollers. The cylindrical surface 48 and the cylindrical bore of the single roller 46 have the lowest contact stress and thus is the best place to take axial sliding. The curved surface 64—housing raceway contact, and the needle roller curved surface 66—sleeve inner race 42 contact are constructed to optimize the stress levels at the needle roller contacts and the single roller—raceway contact for a given set of joint operating conditions. That is, the stress levels at the outer roller 46 raceway contact when compared to the stress levels at the needle roller-race 42 contact is made substantially equal and optimized.

An annular keeper 60 may be used to retain clip ring 55 in groove 50, as shown in the embodiment of FIG. 4. Also, though not shown, a keeper may be used with the embodiment of FIG. 3 to retain the clip ring.

We claim:

1. A universal joint having a housing provided with a plurality of circumferentially spaced pairs of parallel flat raceways, a rotatable shaft; circumferentially spaced bearing supports on the shaft, each bearing support extending radially from the shaft to between a pair of circumferentially spaced pairs of said housing raceways, a bearing on each bearing support, each bearing comprising: a plurality of rollers around the bearing support; a cylindrical sleeve mounted about the plurality of rollers, the inner surface of the sleeve providing the outer raceway for said rollers; a single roller having a cylindrical inner surface slidably mounted on said sleeve and running between and able to contact either of a spaced pair of said housing raceways, said plurality of rollers and sleeve being rotatable about the bearing support and located axially on the bearing support, said single roller being rotatable about the bearing support and slidable axially on the sleeve.

2. A universal joint in accordance with claim 1 wherein: the sleeve and single roller rotate about the bearing support at approximately the same r.p.m.

3. A universal joint in accordance with claim 2 wherein: a centering spring is located adjacent each axial end of the single roller to locate the single roller axially centrally on the sleeve when no torque is transmitted by the universal joint.

4. A universal joint in accordance with claim 3 wherein: the single roller has a curved surface running between the spaced pair of housing raceways.

5. A universal joint in accordance with claim 4 wherein: the plurality of rollers around the bearing support each have a curved periphery.

* * * * *